United States Patent [19]
Burgess et al.

[11] Patent Number: 5,392,228
[45] Date of Patent: Feb. 21, 1995

[54] RESULT NORMALIZER AND METHOD OF OPERATION

[75] Inventors: Bradley G. Burgess; Timothy A. Elliott; Christopher H. Olson; Terence M. Potter, all of Austin, Tex.

[73] Assignee: Motorola, Inc., Schaumburg, Ill.

[21] Appl. No.: 161,361

[22] Filed: Dec. 6, 1993

[51] Int. Cl.⁶ .......................... G06F 5/01; G06F 7/50
[52] U.S. Cl. ................... 364/715.04; 364/748
[58] Field of Search ............... 364/715.04, 715.1, 748

[56] References Cited

U.S. PATENT DOCUMENTS

| | | | |
|---|---|---|---|
| 5,187,678 | 2/1993 | Hori | 364/715.04 |
| 5,204,825 | 4/1993 | Ng | 364/715.04 |
| 5,241,490 | 8/1993 | Poon | 364/715.04 |
| 5,317,527 | 5/1994 | Britton et al. | 364/715.04 |
| 5,343,413 | 8/1994 | Inoue | 364/715.04 |

Primary Examiner—David H. Malzahn
Attorney, Agent, or Firm—Lee E. Chastain

[57] ABSTRACT

A result normalizer (58) for use with an adder (56) generates a mask in two stages that indicates the location of the leading one in the adder result. In the first stage, a leading zero anticipator (68) determines the position to within two digits. In the second stage, a count leading zero indicator (70) determines the position to a single digit. The mask is used to control the number of digits that each stage of a multiplexer array (66) shifts the adder result. The output of the multiplexer array thereby contains a leading one. The result normalizer may be advantageously used in high performance applications such as in a floating point execution unit in a data processor or in digital signal processing systems.

5 Claims, 4 Drawing Sheets

RESULT NORMALIZER AND METHOD OF OPERATION

FIELD OF THE INVENTION

The present invention generally relates to digital computing systems, and more specifically to a normalizer.

BACKGROUND OF THE INVENTION

Digital computing systems often express data in "scientific notation" or "floating point" format. In scientific notation, a number consists of a mantissa and an exponent. The value of the number is the product of the mantissa, the radix of the numbering system and the exponent if the exponent is positive. Conversely, the value of the number is the quotient of the mantissa and the product of the radix and the exponent if the exponent is negative. In digital computing systems, the radix of the most common numbering system is two.

Digital computing systems often require that a mantissa of a binary number have a one in its leading digit, or most significant bit. The exponent is then adjusted so that value, as described above, is equal to the value of the number as originally expressed. Digital computing systems make this requirement for several reasons, including improved data precision, implementation speed and industry norms.

Normalizers are a class of devices that receive data expressed in scientific notation and adjust the mantissa and exponent such that the mantissa has a one in the leading digit. Known normalizers perform their function in a number of serialized steps. For instance, a known normalizer might receive a sixty-four bit un-normalized mantissa and output a normalized mantissa in three stages.

In the first stage of a known normalizer, the normalizer determines if the leading one is in the first sixteen digits, is in one of the seventeenth through thirty-second digits, is in one of the thirty-third through forty-eighth digits, or is in one of the forty-ninth through sixty-fourth digits. The result of this first determination controls the output of a first four-to-one, sixty-four-bit multiplexer. The first multiplexer outputs either the input value, the input shifted sixteen digits and concatenated with sixteen zeros, the input shifted thirty-two digits and concatenated with thirty-two zeros, or the input shifted forty-eight digits and concatenated with forty-eight zeros. After this stage, the mantissa's leading one is in one of the first sixteen digits.

In the second stage of the known normalizer, the normalizer determines if the leading one is in the first four digits of the first stage output, is in one of the fifth through eighth digits, is in one of the ninth through twelfth digits, or is in one of the thirteenth through sixteenth digits. The result of this second determination controls the output of a second four-to-one, sixty-four-bit multiplexer. The second multiplexer outputs either the output of the first multiplexer, the output of the first multiplexer shifted four digits and concatenated with four zeros, the output of the first multiplexer shifted eight digits and concatenated with eight zeros, or the output of the first multiplexer shifted twelve digits and concatenated with twelve zeros. After this stage, the mantissa's leading one is in one of the first four digits.

In the third stage of the known normalizer, the normalizer determines if the leading one is in the first digit of the second stage output, is in the second digit, is in the third digit, or is in the fourth digit. The result of this third determination controls the output of a third four-to-one, sixty-four-bit multiplexer. The third multiplexer outputs either the output of the second multiplexer, the output of the second multiplexer shifted one digit and concatenated with one zero, the output of the second multiplexer shifted two digits and concatenated with two zeros, or the output of the second multiplexer shifted three digits and concatenated with three zeros. After this stage, the mantissa's leading one is in the first digit.

The critical speed path of a known three-stage normalizer is the propagation delay through three four-to-one multiplexers and three sets of decode circuits because the three determinations described above require intermediate shift results.

SUMMARY OF THE INVENTION

In accordance with the present invention, there is disclosed a result normalizer which substantially eliminates disadvantages of known normalizers and methods of normalizing.

A result normalizer for use with an adder has a first mask circuitry, a second mask circuitry, an encoding circuitry, a first multiplexer, and a second multiplexer circuitry. The adder receives a first and a second operand and generates a result logically equivalent to the sum of the first and second operand. The first mask circuitry receives the first and second operand and generates a first mask responsive to the first and second operands. The first mask indicates the position of the leading one within the result and the position adjacent to the position of the leading one. The second mask circuitry is coupled to the first mask circuitry, receives the first mask and the result, and generates a second mask responsive to the first mask and to the result. The second mask indicates the position of the leading one within the result. The encoding circuitry is coupled to the second mask circuitry, receives the second mask, and generates a first and a second control signal. The first multiplexer is coupled to the encoding circuitry, receives the result and the first control signal, and shifts the result a first number of digits responsive to the first control signal. The first multiplexer generates a shifted result. The second multiplexer is coupled to the encoding circuitry and to the first multiplexer, receives the shifted result and the second control signal, and shifts the shifted result a second number of digits responsive to the second control signal. The second multiplexer generates a normalized result.

A method of operating a result normalizer is also described having the steps of receiving a first and a second operand in an adder, generating a result in the adder, generating a first mask in a first mask circuitry, generating a second mask in a second mask circuitry, generating a first and a second control signal in an encoding circuitry coupled to second mask circuitry, shifting the result in a first multiplexer, and shifting a shifted result in a second multiplexer. The adder result is logically equivalent to the sum of the first and second operand. The first mask is responsive to the first and second operands, and indicates the position of the leading one within the result and the position adjacent to the position of the leading one. The second mask circuitry is coupled to the first mask circuitry. The second mask is responsive to the first mask and to the result, and indicates the position of the leading one within the result. The first step of shifting shifts the result a first number of digits responsive to the first control signal. The first multiplexer generates a shifted result. The second step of shifting shifts the shifted result a second number of digits responsive to the second control signal, and generates a normalized result.

BRIEF DESCRIPTION OF THE DRAWINGS

The features and advantages of the present invention will be more clearly understood from the following detailed description taken in conjunction with the accompanying FIGURES where like numerals refer to like and corresponding parts and in which.

DETAILED DESCRIPTION OF A PREFERRED EMBODIMENT

Figure 1:
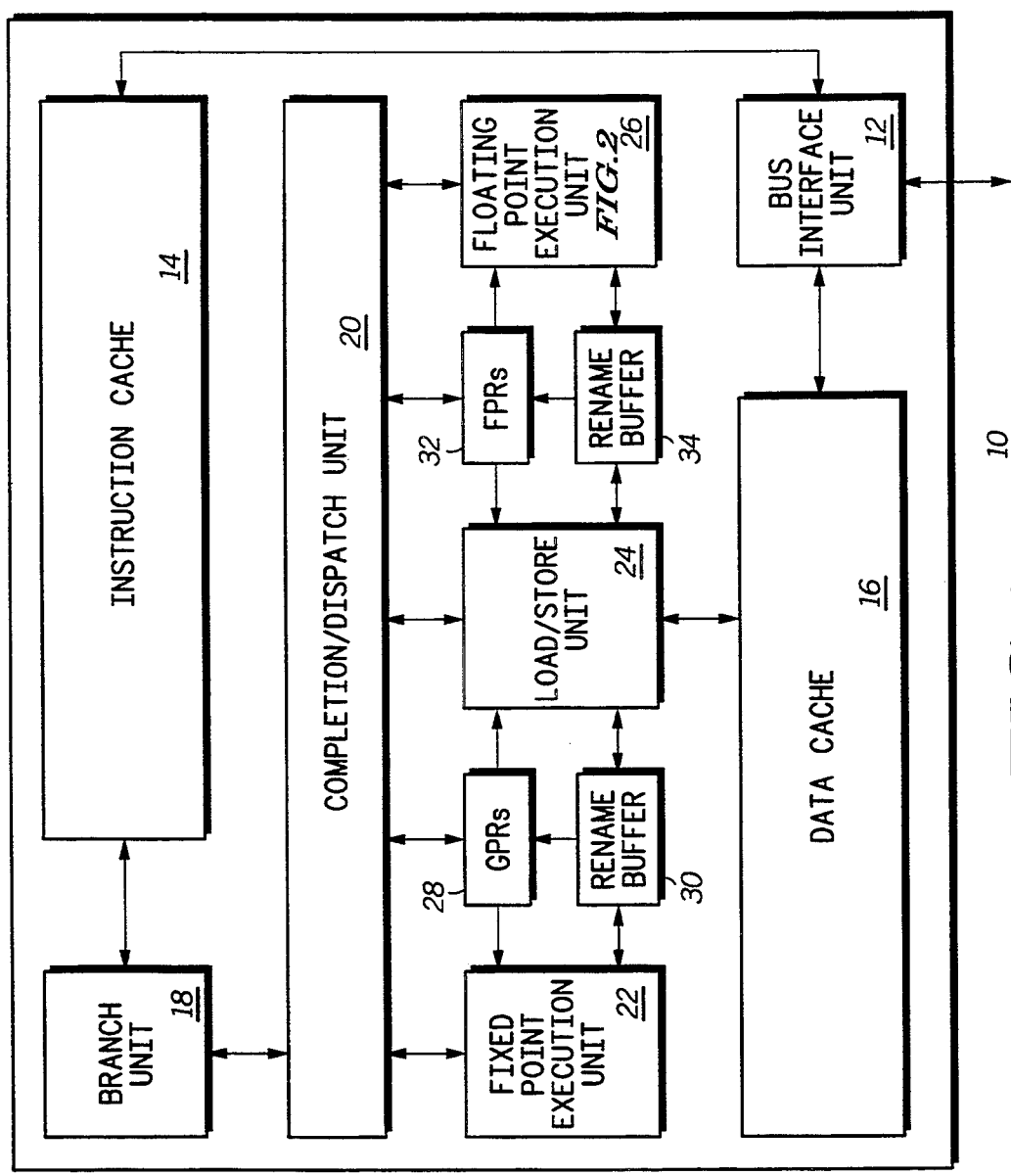
FIG. 1 depicts a block diagram of a data processor constructed in accordance with the present invention.

FIG. 1 depicts a block diagram of a data processor 10 constructed in accordance with the present invention. Data processor 10 manipulates certain data in scientific notation. Data processor 10 has a normalizer that determines the number of digits that data must be shifted to place a one in the leading digit from input data. The disclosed normalizer does not use intermediate shift results to determine subsequent shift amounts. Therefore, the critical speed path of the disclosed normalizer is the propagation delay through a multiplexer array and a single level of decode logic. The disclosed normalizer is suitable for use in high speed applications such as in data processors, digital signal processing and the like.

Continuing with FIG. 1, a bus interface unit (hereafter BIU) 12 controls the flow of data between data processor 10 and the remainder of a data processing system (not depicted). BIU 12 is connected to an instruction cache 14 and to a data cache 16. Instruction cache 14 supplies an instruction stream to a branch unit 18 and to a completion/dispatch unit 20. Branch unit 18 is more fully described below in connection with FIGS. 2 and 3. Completion/dispatch unit 20 forwards individual instructions to an appropriate execution unit. Data processor 10 has a fixed point execution unit 22, a load/store execution unit 24, and a floating point execution unit 26. Fixed point execution unit 22 and load/store execution unit 24 read and write their results to a general purpose architectural register file 28, (labeled GPRs and hereafter GPR file) and to a first rename buffer 30. Floating point execution unit 26 and load/store execution unit 24 read and write their results to a floating point architectural register file 32, (labeled FPRs and hereafter FPR file) and to a second rename buffer 34.

The operation of data processor 10 without the disclosed normalizer is known in the art. In general, branch unit 18 determines what sequence of programmed instructions is appropriate given the contents of certain data registers and the program steps themselves. Completion/dispatch unit 20 issues the individual instructions to the various execution units 22, 24 and 26. Each of the execution units performs one or more instructions of a particular class of instructions. The particular class of instructions of each execution unit is indicated by the name of the execution unit. For instance, floating point execution unit 26 manipulates data represented in scientific notation. Floating point execution unit 26 is described below in connection with FIGS. 2 through 5.

Fixed point execution unit 22 returns the results of its operations to designated entries in first rename buffer 30. First rename buffer 30 periodically updates an entry of GPR file 28 with an entry from first rename buffer 30 when all instructions preceding the instruction that generated the result have updated their GPR file entries. Completion/dispatch unit 20 coordinates this updating. Both first rename buffer 30 and GPR file 28 can supply operands to fixed point execution unit 22. Conversely, floating point execution unit 26 returns the results of its operations to designated entries in second rename buffer 34. Second rename buffer 34 periodically updates an entry of FPR file 32 with an entry in second rename buffer 34 when all instructions preceding the instruction that generated the result have updated their FPR file entries. Completion/dispatch unit 20 also coordinates this updating. Both second rename buffer 34 and FPR file 32 supply operands to floating point execution unit 26.

Load/store unit 24 reads data stored in GPR file 28, first rename buffer 30, FPR file 32 or second rename buffer 34 and writes the selected data to data cache 16. This data may also be written to an external memory system (not depicted) depending upon operating characteristics of data processor 10 not relevant to the disclosed invention. Conversely, load/store unit 24 reads data stored in data cache 16 and writes the read data to GPR file 28, first rename buffer 30, FPR file 32 or second rename buffer 34.

The operation of data processor 10 with the disclosed normalizer is described below in connection with FIGS. 2 through 5. In general, data processor 10 is a reduced instruction set computer ("RISC"). Data processor 10 achieves high performance by breaking each instruction into a sequence of smaller steps, each of which may be overlapped in time with steps of other instructions. This performance strategy is known as "pipe lining." Each pipeline step must be executed in a certain maximum time period for it to be compatible with all other pipeline steps.

In the depicted embodiment, each instruction is broken into as many as five discrete steps: fetch, dispatch, execute, write-back, and completion. Memory management circuitry (not shown) within instruction cache 14 retrieves one or more instructions beginning at a memory address identified by branch unit 18 during the fetch phase. Completion/dispatch unit 20 routes each instruction to the appropriate execution unit after determining that there are no impermissible data dependencies and after reserving a rename buffer entry for the result of the instruction in the dispatch phase. Each particular execution unit executes its programmed instruction during the execution phase and writes its result, if any, to the reserved rename buffer entry during the write-back phase. Finally, completion/dispatch unit 20 updates the architectural register files with the result of a particular instruction stored in a rename buffer after every instruction preceding the particular instruction has so updated the architectural register file. Generally, each instruction phase takes one machine clock cycle.

However, some instructions require more than one clock cycle to execute while others do not require all five phases. Floating point instructions, for instance, take three cycles to execute. The disclosed normalizer is used in the third of these three execution cycles to normalize data output from floating point unit 26. There may also be a delay between the write-back and completion phases of a particular instruction due to the range of times which the various instructions take to complete.

Figure 2:
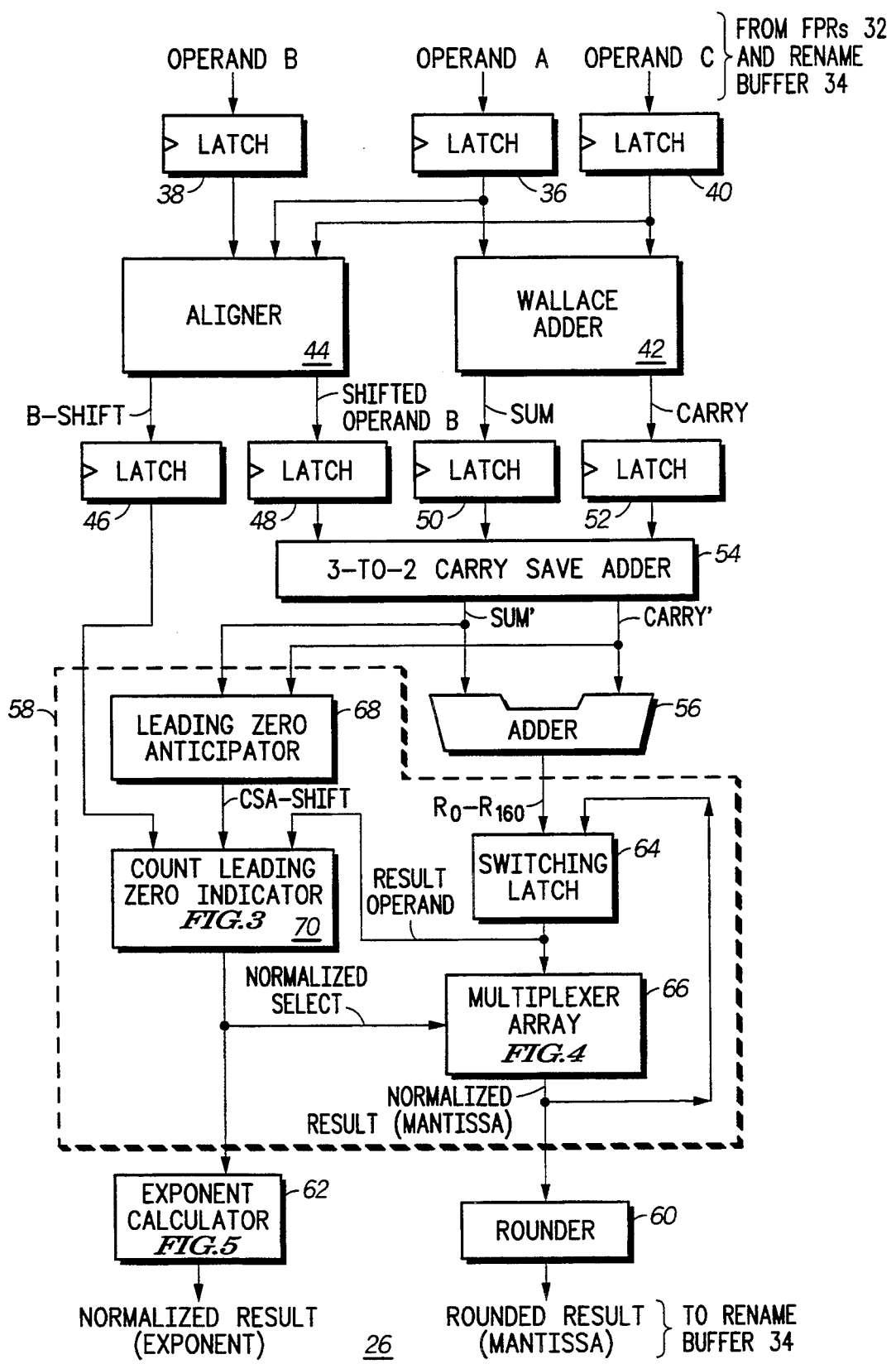
FIG. 2 depicts a block diagram of a floating point execution unit depicted in FIG. 1.

FIG. 2 depicts a block diagram of floating point execution unit 26 depicted in FIG. 1. Floating point execution unit 26 executes the "fused-multiply-add" and "fused-multiply-subtract" instructions from the PowerPC architecture instruction set. The fused-multiply-add and fused-multiply-subtract instructions execute the arithmetic operations (A*C)+B and (A*C)−B, respectively, where A, B, and C are input operands expressed in scientific notation, with a leading one in each operand. The mantissa and exponent of each of operands A, B, and C are fifty-three and eleven bits in length, respectively. Floating point execution unit 26 executes the fused-multiply-add instruction in three clock cycles.

In the first of the three clock cycles, the operands A, B and C are latched by latches 36, 38 and 40, respectively. In this first stage, the operands A and C are multiplied together and the operand B is prepared for addition to the product (A*C).

A Wallace adder 42 or carry-save adder array generates the product (A*C). Wallace adder 42 receives the operands A and C and reduces the multiply operation to the sum of two intermediate results, known and labeled as "sum" and "carry." The two intermediate results are contained within two 106 digit strings: two digits to the left of the binary decimal place and 104 fractional digits.

An aligner 44 prepares B for addition to the product (A*C). First, aligner 44 shifts the B operand to match the exponent of the product (A*C). Second, aligner 44 formats the B operand consistent with its sign bit and the mathematical operation selected by the floating point instruction. Aligner 44 receives the B operand and the exponents of the A and C operands.

Aligner 44 shifts the mantissa of operand B in preparation for its addition with the intermediate results of Wallace adder 42. Aligner 44 may be a bi-directional shifter that shifts the mantissa of operand B by Z places, where Z equals the exponent of operand A plus the exponent of operand C minus the exponent of operand B. Aligner 44 shifts the mantissa of operand B Z places to the left is Z is negative and Z places to the right if Z is positive.

In the depicted embodiment, data processor 10 is a high performance data processor. In such an application, a bi-directional shifter as described above is a relatively large, slow circuit. Therefore, aligner 44 is implemented as a right-only shifter. Conceptually, the mantissa of operand B is shifted fifty-six places to the left and the exponent of operand B is decremented by fifty-six. Actually, aligner 44 only shifts the mantissa of the operand B a certain number of places to the right. If necessary, the disclosed normalizer (described below) will shift the mantissa of the operand to the left at a later time. The certain number of places of right shift equals the greater of (1) zero or, (2) (EA+EC−(EB−56)), where EA, EB, and EC are the exponents of operands A, B, and C, respectively. Aligner 44 also generates a first intermediate mask B-SHIFT. B-SHIFT indicates where the leading one is in the operand B after the right shift ($2^6$ encoded to 1-on-of-55) and the two bits immediately adjacent the bit indicating the position of the leading one digit.

Aligner 44 also performs a bit-wise operation on the mantissa of operand B to account for its sign-bit and the mathematical instruction performed by floating point unit 26. Aligner 44 performs the bit-wise inversion by exclusively ORing (XORing) a control signal LOGICAL SUB with each bit, putting the operand in two's complement notation. (Two's complement notation also requires that one be added to the inverted operand. This addition is done conditionally. A further explanation appears below in connection with adder 56.) LOGICAL SUB indicates that floating point unit 26 is to subtract the product (A*C) from B because either (1) (A*C) and B have the same sign and the instruction is a subtraction (fused-multiply-subtract instruction) or (2) (A*C) and B have different signs and the instruction is an add instruction.

In the second of the three clock cycles, the value of B-shift, the right-shifted mantissa of the operand B, and the intermediate sum and carry results are latched by latches 46, 48, 50 and 52, respectively. A carry-save-adder 54 receives the right-shifted mantissa of the operand B and the intermediate sum and carry results. Carry-save-adder 54 reduces the addition operation to the sum of two new intermediate results, "sum'" and "carry'." The two new intermediate results are contained within two 161 digit strings. A full adder 56 adds the intermediate results sum' and carry' to generate the result sum, labeled $R_0$–$R_{160}$. Adder 56 also adds the one omitted by aligner 44 if necessary. Adder 56 compares the magnitude of the product (A*C) and the mantissa of the operand B. If the product (A*C) is larger than B, then the result will be a positive number. In this case, adder 56 adds the one omitted by aligner 44. If the product (A*C) is smaller than B, then the result will be a negative number. In this case, adder 56 performs a bit-wise inversion to place the result in two's complement notation. Ordinarily an adder would add a one to its result in the second case. In the depicted embodiment, however, aligner 44 and adder 56 can both omit the addition step if the result is negative and maintain functionality.

In the third of the three clock cycles, a normalizer 58 latches the result sum and then ensures that there is a leading one in the result sum. Normalizer 58 is described below. A rounder receives the normalized result from normalizer 58 and rounds the result to conform to IEEE standards or to other standards selected by the user not relevant to the disclosed invention. An exponent calculator 62 generates the normalized exponent result concurrently with the generation of the rounded result. Exponent calculator 62 is described below in connection with FIG. 5.

Returning to normalizer 58, a switching latch 64 receives the result sum from adder 56 and the sixty-four most significant bits of the normalized result from a multiplexer array 66. Multiplexer array 66 left-shifts the output of switching latch 64 in two or more serial stages responsive to a control signal NORMALIZED SELECT. Multiplexer array 66 is described below in connection with FIG. 4. A leading zero anticipator (hereafter LZA) 68 and a count leading zero indicator (hereafter CLZ) 70 generate the control signal NORMALIZED SELECT from received inputs B-shift, sum', carry' and a result operand. LZA 68 determines where the leading one is in the result sum to within two digits.

LZA 68 is described below. CLZ 70 determines in which one of the two digits indicated by LZA 68 is the leading one. CLZ 70 also converts this information into the control signal NORMALIZED SELECT. CLZ 70 is described below in connection with FIG. 3. LZA 68 and CLZ 70 generate the control signals necessary for each level of multiplexer in multiplexer array 66 at one time. Therefore, the disclosed invention decreases the propagation delay of the result sum through multiplexer array 66 relative to prior normalizers.

Under most circumstances, switching latch 64 latches each new result sum from adder 56 in preparation for normalization. However, in certain cases (e.g., subtraction operations where $A*C \approx B$), normalizer 58 can not normalize the result sum in a single operation. In these cases, the output of multiplexer array 66 does not have a leading one in its most significant bit. Switching latch 64 detects this case, and latches the sixty-four most significant bits from multiplexer array 66 for a second pass through multiplexer array 66. In this case, switching latch 64 outputs the sixty-four most significant bits from multiplexer array 66 as the result operand. Normally, switching latch 64 outputs the sixty-four most significant bits of result sum from adder 56 as the result operand.

LZA 68 generates a second intermediate mask CSA-SHIFT$_{55}$ through CSA-SHIFT$_{63}$. This intermediate mask indicates where, within two digits, the leading one is in the first eight digits of the result sum output by adder 56. For speed purposes, LZA 68 does not look at all possible digits. In the case of addition operations, the leading one will shift left no more than one place, depending upon the carry-in bit. In the case of subtraction operations, the leading one will shift to the right depending upon the number of consecutive identical bits in the two operands: "bit-cancellation." This number is infrequently larger than eight digits. If the leading one is not within these eight digits or the fifty-six digits occupied by the B operand, then normalizer 58 will perform a second normalizing operation on the next most significant sixty-four bits. In either case, $$CSA-SHIFT_i = (SHIFT_{i-52} \& SHIFT_{i-53}) \text{ for } 55 \leq i \leq 62 \quad \text{EQ. 1}$$
and
$$CSA-SHIFT_{63} = SHIFT_{10};$$
where
$$SHIFT_i = (SCAN_{i-1} \& SCAN_i) \text{ for } 2 \leq i \leq 9 \quad \text{EQ. 2}$$
and
$$SHIFT_{10} = SCAN_9;$$
$$SCAN_i = (LZS1_i \text{ OR } LSZO_i) \text{ for } 1 \leq i \leq 9; \quad \text{EQ. 3}$$

$$LZS1_i = \sum_{n=0}^{i} LZS1_n \& PG_{i-1} \text{ for } 1 \leq i \leq 9; \quad \text{EQ. 4}$$

$$LZSO_i = \sum_{n=0}^{i} LZSO_n \& PZ_{i-1} \text{ for } 1 \leq i \leq 9; \quad \text{EQ. 5}$$

$$PG_i = (POUT_i) XOR (GOUT_{i+1}) \text{ for } 0 \leq i \leq 8; \quad \text{EQ. 6}$$
$$PZ_i = (POUT_i) XOR (NOUT_{i+1}) \text{ for } 0 \leq i \leq 8; \quad \text{EQ. 7}$$
$$POUT_i = (SUM_i') XOR (CARRY_{i+1}') \text{ for } 0 \leq i \leq 8; \quad \text{EQ. 8}$$
$$GOUT_i = (SUM_i') \& (CARRY_{i+1}') \text{ for } 1 \leq i \leq 9; \quad \text{EQ. 9}$$
$$NOUT_i = (SUM_i') OR (CARRY_{i+1}') \text{ for } 1 \leq i \leq 9; \quad \text{EQ. 10}$$

Equations 1 through 10 may be extended beyond the range of i indicated above if it is advantageous to increase the normalizing range beyond eight digits in a particular embodiment.

Figure 3:
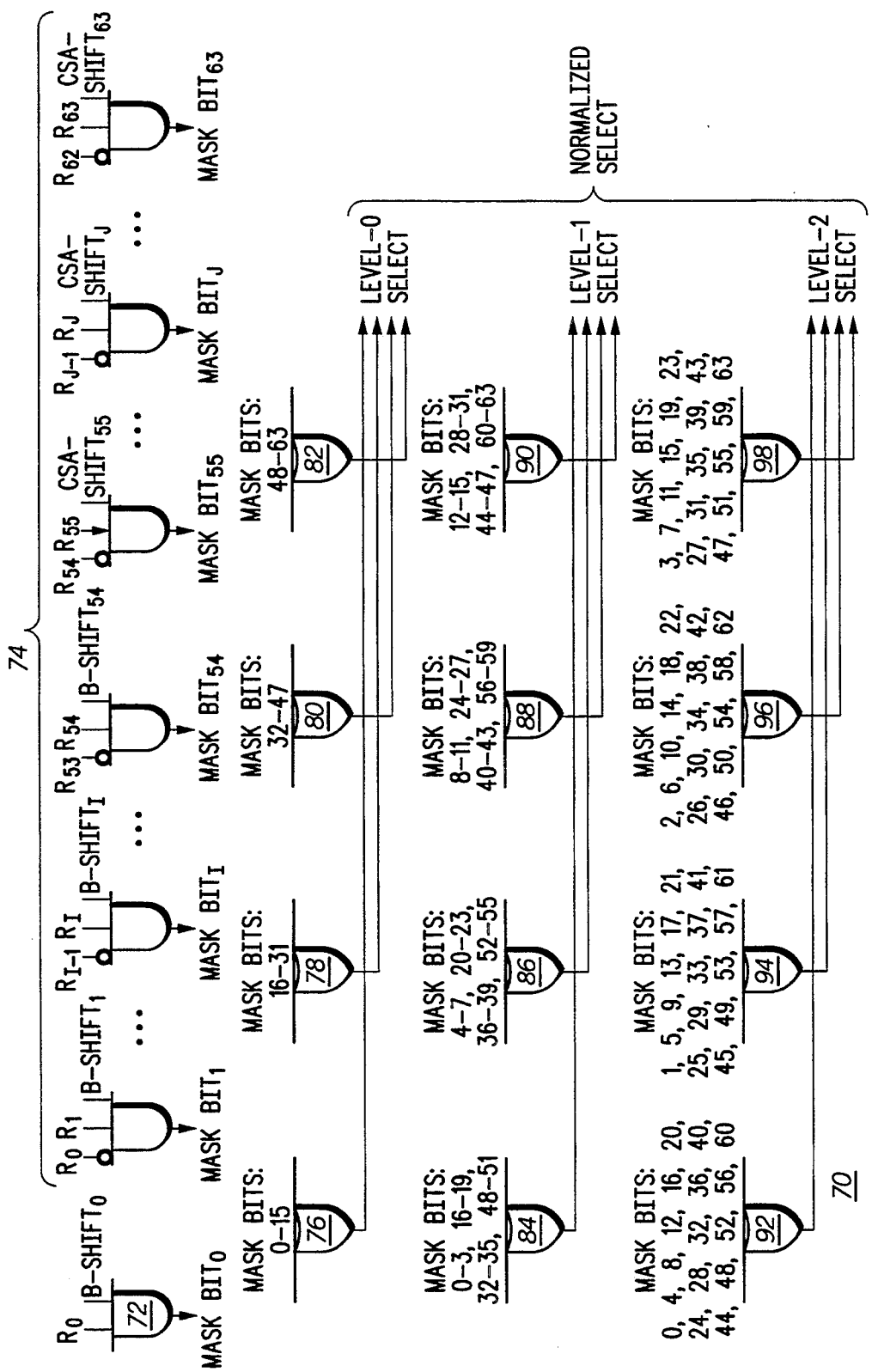
FIG. 3 depicts a block diagram of a count leading zero indicator depicted in FIG. 2.

FIG. 3 depicts a block diagram of CLZ 70 depicted in FIG. 2. CLZ 70 has one two-input AND gate 72 and sixty-three three-input AND gates, collectively 74: one for each digit of possible normalization. The sixty-four AND gates 72 and 74 generate the sixty-four bit control signal MASK BIT. In general, only one bit of the control signal MASK BIT will ever be asserted at a given time. This bit indicates where the leading one is in the result sum. AND gate 72 receives the most significant result bit, $R_0$, and the most significant B-SHIFT bit, B-SHIFT$_0$. The Ith AND gate 74 receives the logical complement of the (Ith-1) result bit, $R_{I-1}$, the Ith result bit, $R_I$, and the Ith B-SHIFT bit, B-SHIFT$_I$, for $1 \leq I \leq 54$. The Jth AND gate 74 receives the logical complement of the (Jth -1) result bit, $R_{J-1}$, the Jth result bit, $R_J$, and the Jth CSA-SHIFT bit, CSA-SHIFT$_J$, for $55 \leq J \leq 63$.

The control signal MASK BIT simultaneously generates all bits of the control signal NORMALIZED SELECT. The control signal NORMALIZED SELECT controls three serial stages of left bit-shifting in multiplexer array 66. Four control lines of NORMALIZED SELECT constitute a control signal LEVEL-O SELECT. LEVEL-O SELECT determines if the first stage of bit-shifting in multiplexer array 66 shifts the result sum zero, sixteen, thirty-two or forty-eight digits leftwards. Four control lines of NORMALIZED SELECT constitute a control signal LEVEL-1 SELECT. LEVEL-1 SELECT determines if the first stage of bit-shifting in multiplexer array 66 shifts the result sum zero, four, eight or twelve digits leftwards. Four control lines of NORMALIZED SELECT constitute a control signal LEVEL-2 SELECT. LEVEL-2 SELECT determines if the first stage of bit-shifting in multiplexer array 66 shifts the result sum zero, one, two or three digits leftwards.

Four OR gates 76, 78, 80, and 82 generate the four control lines that constitute LEVEL-0 SELECT. OR gate 76 receives the 0th through the 15th bit of MASK BIT. OR gate 78 receives the 16th through the 31st bit of MASK BIT. OR gate 80 receives the 32nd through the 47th bit of MASK BIT. OR gate 82 receives the 48th through the 63rd bit of MASK BIT.

Four OR gates 84, 86, 88, and 90 generate the four control lines that constitute LEVEL-1 SELECT. OR gate 84 receives the 0th through 3rd bit, the 16th through 19th bit, the 32nd through 35th bit, and the 48th the 51st bit of MASK BIT. OR gate 86 receives the 4th through 7th bit, the 20th through 23rd bit, the 36th through 39th bit, and the 52nd through 55th bit of MASK BIT. OR gate 88 receives the 8th through 11th bit, the 24th through 27th bit, the 40th through 43rd bit, and the 56th through 59th bit of MASK BIT. OR gate 90 receives the 12th through 15th bit, the 28th through 31st bit, the 44th through 47th bit, and the 60th through 63rd bit of MASK BIT.

Four OR gates 92, 94, 96, and 98 generate the four control lines that constitute LEVEL-2 SELECT. OR gate 92 receives the 0th, 4th, 8th, 12th, 16th, 20th, 24th, 28th, 32nd, 36th, 40th, 44th, 48th, 52nd, 56th and 60th bits of MASK BIT. OR gate 94 receives the 1st, 5th, 9th, 13th, 17th, 21st, 25th, 29th, 33rd, 37th, 41st, 45th, 49th, 53rd, 57th and 61st bits of MASK BIT. OR gate 96 receives the 2nd, 6th, 10th, 14th, 18th, 22nd, 26th, 30th, 34th, 38th, 42nd, 46th, 50th, 54th, 58th and 62nd bits of MASK BIT. OR gate 98 receives the 3rd, 7th, 11th, 15th, 19th, 23rd, 27th, 31st, 35th, 39th, 43rd, 47th, 51st, 55th, 59th and 63rd bits of MASK BIT.

Figure 4:
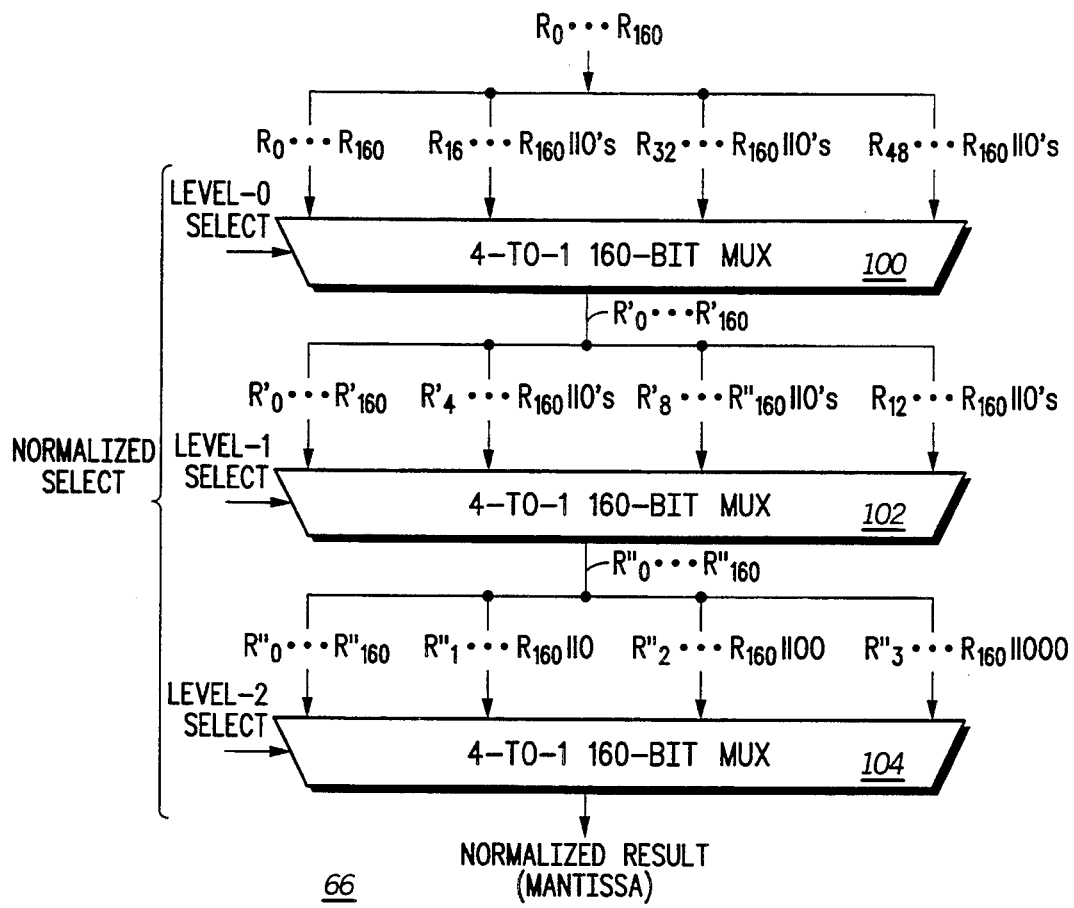
FIG. 4 depicts a block diagram of a multiplexer array depicted in FIG. 2.

FIG. 4 depicts a block diagram of multiplexer array 66 depicted in FIG. 2. The depicted multiplexer array 66 left-shifts the result sum in three serial stages. However, as described above, the control signals for each stage are generated in parallel by LZA 68 and CLZ 70.

In the first stage of left-shifting, a first multiplexer 100 outputs one of four inputs responsive to the control signal LEVEL-0 SELECT. First multiplexer 100 receives the result sum, the sixteenth through one hundred and sixtieth bits of the result sum concatenated with sixteen zeros, the thirty-second through one hundred and sixtieth bits of the result sum concatenated with thirty-two zeros, and the forty-eighth through one hundred and sixtieth bits of the result sum concatenated with forty-eight zeros. First multiplexer 100 generates the first stage output $R'_0$ through $R'_{160}$. The first stage output is logically equivalent to the first input above if OR GATE 76 asserts its output. The first stage output is logically equivalent to the second input above if OR GATE 78 asserts its output. The first stage output is logically equivalent to the third input above if OR GATE 80 asserts its output. The first stage output is logically equivalent to the fourth input above if OR GATE 82 asserts its output.

In the second stage of left-shifting, a second multiplexer 102 outputs one of four inputs responsive to the control signal LEVEL-1 SELECT. Second multiplexer 102 receives the first stage output, the sixteenth through one hundred and sixtieth bits of the first stage output concatenated with sixteen zeros, the thirty-second through one hundred and sixtieth bits of the first stage output concatenated with thirty-two zeros, and the forty-eighth through one hundred and sixtieth bits of the first stage output concatenated with forty-eight zeros. Second multiplexer 102 generates the second stage output $R''_0$ through $R''_{160}$. The second stage output is logically equivalent to the first input above if OR GATE 84 asserts its output. The first stage output is logically equivalent to the second input above if OR GATE 86 asserts its output. The first stage output is logically equivalent to the third input above if OR GATE 88 asserts its output. The first stage output is logically equivalent to the fourth input above if OR GATE 90 asserts its output.

In the third stage of left-shifting, a third multiplexer 104 outputs one of four inputs responsive to the control signal LEVEL-2 SELECT. Third multiplexer 104 receives the second stage output, the sixteenth through one hundred and sixtieth bits of the second stage output concatenated with sixteen zeros, the thirty-second through one hundred and sixtieth bits of the second stage output concatenated with thirty-two zeros, and the forty-eighth through one hundred and sixtieth bits of the second stage output concatenated with forty-eight zeros. Third multiplexer 104 generates the output NORMALIZED RESULT. The output NORMALIZED RESULT is logically equivalent to the first input above if OR GATE 92 asserts its output. The output NORMALIZED RESULT is logically equivalent to the second input above if OR GATE 94 asserts its output. The output NORMALIZED RESULT is logically equivalent to the third input above if OR GATE 96 asserts its output. The output NORMALIZED RESULT is logically equivalent to the fourth input above if OR GATE 98 asserts its output.

Figure 5:
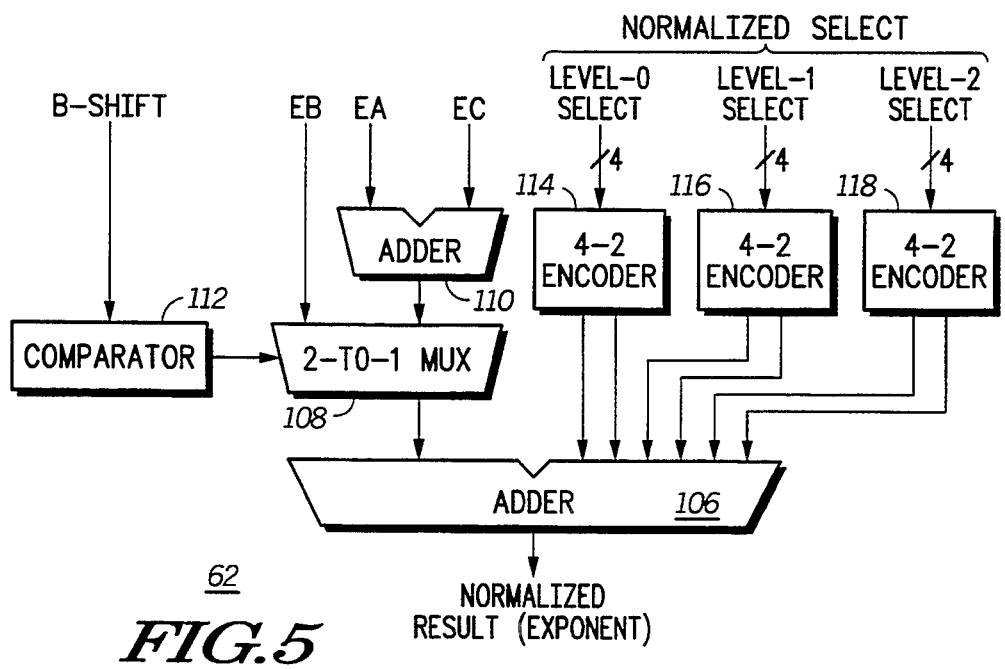
FIG. 5 depicts a block diagram of a exponent calculator depicted in FIG. 2.

FIG. 5 depicts a block diagram of exponent calculator 62 depicted in FIG. 2. Exponent calculator 62 receives the inputs B-SHIFT, EA, EB, EC (the exponents of the operands A, B, and C, respectively), and the control signal NORMALIZED SELECT and generates the output NORMALIZED RESULT (EXPONENT). An adder 106 adds the exponent of the result sum and the number of places the result sum is left-shifted by multiplexer array 66. A multiplexer 108 generates the exponent of the result sum. Multiplexer 108 receives EB and the output of an adder 110. Adder 110 adds EA and EC. A comparator 112 receives B-SHIFT and compares the input to fifty-six. If B-SHIFT is larger than fifty-six, then the product (A*C) is larger than the operand B. In this case, comparator 112 causes multiplexer 108 to output the sum of EA and EC. If B-SHIFT is smaller than or equal to fifty-six, then the product (A*C) is smaller than the operand B. In this case, comparator 112 causes multiplexer 108 to output EB. A first encoder 114 generates the two most significant bits of the number of places the result sum is left-shifted by multiplexer array 60. A second encoder 116 generates the third and fourth most significant bits of the number of places the result sum is left-shifted by multiplexer array 60. A third encoder 118 generates the two least significant bits of the number of places the result sum is left-shifted by multiplexer array 60. Encoders 114, 116, and 118 receive the control signals LEVEL-O SELECT, LEVEL-1 SELECT and LEVEL-2 SELECT, respectively. Each encoder receives a one-on-of-four input and converts it into a two-bit binary representation.

Although the present invention has been described with reference to a specific embodiment, further modifications and improvements will occur to those skilled in the art. For instance, the disclosed invention may be incorporated into data processors traditionally classified as complex instruction set computers or CISC machines, into other types of digital circuits or as a stand alone device. Also, certain functional units may be omitted, expanded, or relocated in certain embodiments. For instance, multiplexer array 66 may contain any number of multiplexers. It is to be understood therefore, that the invention encompasses all such modifications that do not depart from the spirit and scope of the invention as defined in the appended claims.

What is claimed is:

1. A result normalizer for use with an adder, the adder receiving a first and a second operand, the adder generating a result logically equivalent to the sum of the first and second operand, the normalizer comprising:

first mask circuitry receiving the first and second operand, the first mask circuitry generating a first mask responsive to the first and second operands, the first mask indicating a position of a leading one within the result and a position adjacent to the position of the leading one;

second mask circuitry receiving the first mask and the result, the mask circuitry generating a second mask responsive to the first mask and to the result, the second mask indicating the position of the leading one within the result;

encoding circuitry coupled to the second mask circuitry, the encoding circuitry receiving the second mask, the encoding circuitry generating a first and a second control signal;

a first multiplexer coupled to the encoding circuitry, the first multiplexer receiving the result and the first control signal, the first multiplexer shifting the result a first number of digits responsive to the first control signal, the first multiplexer generating a shifted result; and a second multiplexer coupled to the encoding circuitry and to the first multiplexer, the second multiplexer receiving the shifted result and the second control signal, the second multiplexer shifting the shifted result a second number of digits responsive to the second control signal, the second multiplexer generating a normalized result.

2. A data processor comprising:

bus circuitry for receiving an instruction, a first operand, and a second operand;

floating point circuitry coupled to the bus circuitry for executing the instruction, the instruction generating a normalized result, the floating point circuitry comprising:

an adder, the adder receiving the first and the second operand, the adder generating a result logically equivalent to the sum of the first and second operand;

a first mask circuitry receiving the first and second operand, the first mask circuitry generating a first mask responsive to the first and second operands, the first mask indicating a position of a leading one within the result and a position adjacent to the position of the leading one;

a second mask circuitry receiving the first mask and the result, the mask circuitry generating a second mask responsive to the first mask and to the result, the second mask indicating the position of the leading one within the result;

an encoding circuitry coupled to second mask circuitry, the encoding circuitry receiving the second mask, the encoding circuitry generating a first and a second control signal;

a first multiplexer coupled to the encoding circuitry, the first multiplexer receiving the result and the first control signal, the first multiplexer shifting the result a first number of digits responsive to the first control signal, the first multiplexer generating a shifted result; and a second multiplexer coupled to the encoding circuitry and to the first multiplexer, the second multiplexer receiving the shifted result and the second control signal, the second multiplexer shifting the shifted result a second number of digits responsive to the second control signal, the second multiplexer generating the normalized result.

3. The data processor of claim 2 further comprising exponent adder circuitry coupled to the encoding circuitry, the exponent adder receiving the first and the second operand and the first and second control signal, the exponent adder circuitry generating a normalized exponent responsive to the first and the second operand and the first and second control signal.

4. A method of normalizing a result comprising the steps of:

receiving a first and a second operand in an adder;

generating a result in the adder logically equivalent to the sum of the first and second operand;

generating a first mask in a first mask circuitry, the first mask responsive to the first and second operands, the first mask indicating a position of a leading one within the result and a position adjacent to the position of the leading one;

generating a second mask in a second mask circuitry coupled to the first mask circuitry, the second mask responsive to the first mask and to the result, the second mask indicating the position of the leading one within the result;

generating a first and a second control signal in an encoding circuitry coupled to second mask circuitry;

shifting the result in a first multiplexer coupled to the encoding circuitry, the first multiplexer shifting the result a first number of digits responsive to the first control signal, the first multiplexer generating a shifted result; and shifting the shifted result in a second multiplexer coupled to the encoding circuitry and to the first multiplexer, the second multiplexer shifting the shifted result a second number of digits responsive to the second control signal, the second multiplexer generating a normalized result.

5. The method of claim 4 further comprising the step of generating a normalized exponent responsive to the first and the second operand and the first and second control signal in an exponent adder circuitry, the exponent adder coupled to the encoding circuitry, the exponent adder receiving the first and the second operand and the first and second control signal.

* * * * *